United States Patent
Wilkinson

(10) Patent No.: US 10,125,462 B2
(45) Date of Patent: Nov. 13, 2018

(54) EROSION CONTROL APPARATUS

(71) Applicant: Seth Wilkinson, Orleans, MA (US)

(72) Inventor: Seth Wilkinson, Orleans, MA (US)

(73) Assignee: WILKINSON ECOLOGICAL DESIGN, Orleans, MA (US)

( * ) Notice: Subject to any disclaimer, the term of this patent is extended or adjusted under 35 U.S.C. 154(b) by 0 days.

(21) Appl. No.: 15/253,464

(22) Filed: Aug. 31, 2016

(65) Prior Publication Data

US 2018/0058027 A1 Mar. 1, 2018

(51) Int. Cl.
| | |
|---|---|
| *E02B 3/12* | (2006.01) |
| *E02D 17/20* | (2006.01) |
| *E02D 5/80* | (2006.01) |
| *E02D 29/02* | (2006.01) |

(52) U.S. Cl.
CPC ............... *E02B 3/125* (2013.01); *E02B 3/12* (2013.01); *E02B 3/126* (2013.01); *E02B 3/127* (2013.01); *E02D 5/80* (2013.01); *E02D 17/20* (2013.01); *E02D 17/202* (2013.01); *E02D 17/205* (2013.01); *E02D 29/0233* (2013.01)

(58) Field of Classification Search
CPC ......... E02B 3/125; E02B 3/126; E02D 17/20; E02D 17/202; E02D 17/205
USPC ................................ 405/302.4, 302.6, 302.7
See application file for complete search history.

(56) References Cited

U.S. PATENT DOCUMENTS

| | | | | |
|---|---|---|---|---|
| 5,338,131 A | * | 8/1994 | Bestmann | E02B 3/125 |
| | | | | 405/15 |
| 5,509,755 A | | 4/1996 | Olsen et al. | |
| 5,641,244 A | * | 6/1997 | Bestmann | E02B 3/125 |
| | | | | 405/15 |
| 5,658,096 A | * | 8/1997 | Von Kanel | E02D 29/0241 |
| | | | | 405/16 |
| 5,678,954 A | | 10/1997 | Bestmann | |
| 5,786,281 A | | 7/1998 | Prunty et al. | |
| 6,527,477 B1 | * | 3/2003 | Allard | B32B 1/08 |
| | | | | 405/302.6 |
| 6,641,335 B1 | * | 11/2003 | Allard | B32B 1/08 |
| | | | | 405/15 |
| 6,893,193 B2 | * | 5/2005 | Santha | E02B 3/12 |
| | | | | 405/15 |
| 7,029,208 B1 | * | 4/2006 | Santha | E02B 3/125 |
| | | | | 405/15 |
| 7,384,217 B1 | | 6/2008 | Barrett et al. | |
| 7,422,682 B2 | | 9/2008 | McPhillips | |

(Continued)

FOREIGN PATENT DOCUMENTS

| | | |
|---|---|---|
| JP | 2000120070 A | 4/2000 |
| WO | 2009017356 A2 | 2/2009 |
| WO | 2010/085075 A2 | 7/2010 |

OTHER PUBLICATIONS

International Search Report and Written Opinion for PCT/US2017/049717 dated Nov. 24, 2017, pp. 1-18.

*Primary Examiner* — Frederick L Lagman

(74) *Attorney, Agent, or Firm* — McCarter & English, LLP; Thomas O. Hoover

(57) ABSTRACT

The present invention relates to an erosion control apparatus and methods of using and installing the apparatus. The apparatus is constructed to prevent erosion of soil during typical weather conditions and adverse weather events. The apparatus can include a plurality of anchored rolls and soil lifts operative to stabilize the shoreline.

40 Claims, 12 Drawing Sheets

(56) References Cited

U.S. PATENT DOCUMENTS

| | | | |
|---|---|---|---|
| 7,425,107 B2* | 9/2008 | Derache | E01F 7/045 |
| | | | 405/262 |
| 7,674,071 B2* | 3/2010 | Shaw | E02B 3/06 |
| | | | 405/15 |
| 7,789,594 B2* | 9/2010 | Stahm | E02D 17/20 |
| | | | 405/302.4 |
| 8,740,503 B1* | 6/2014 | Tyler | E02D 17/202 |
| | | | 405/264 |
| 8,864,424 B2 | 10/2014 | Jones et al. | |
| 9,315,962 B2* | 4/2016 | Santha | |
| 9,493,923 B1* | 11/2016 | Miller | E02D 29/02 |
| 2002/0131826 A1* | 9/2002 | Spangler | E02B 3/04 |
| | | | 405/302.4 |
| 2003/0143026 A1* | 7/2003 | Santha | E02B 3/12 |
| | | | 405/15 |
| 2004/0005198 A1* | 1/2004 | Spangler | E02B 3/04 |
| | | | 405/302.6 |
| 2004/0228692 A1* | 11/2004 | McCamy | E02B 3/12 |
| | | | 405/302.7 |
| 2005/0161407 A1* | 7/2005 | McPhillips | A01N 25/08 |
| | | | 210/747.3 |
| 2005/0254899 A1* | 11/2005 | Tyler | E02B 3/125 |
| | | | 405/15 |
| 2006/0032804 A1* | 2/2006 | McPhillips | A01N 25/08 |
| | | | 210/205 |
| 2007/0003369 A1 | 1/2007 | Hanson et al. | |
| 2007/0253785 A1* | 11/2007 | Tyler | E02D 17/202 |
| | | | 405/302.6 |
| 2007/0269275 A1 | 11/2007 | Kimberlin | |
| 2009/0071596 A1* | 3/2009 | Theisen | E02D 17/20 |
| | | | 156/189 |
| 2011/0206458 A1* | 8/2011 | Jones | D03D 1/0041 |
| | | | 405/19 |
| 2012/0020745 A1 | 1/2012 | Miller et al. | |
| 2012/0243949 A1* | 9/2012 | Schneider | E02D 5/80 |
| | | | 405/302.7 |
| 2012/0257933 A1* | 10/2012 | De Giuseppe | B29D 28/00 |
| | | | 405/302.7 |
| 2015/0132060 A1* | 5/2015 | Stehling | A01G 13/0256 |
| | | | 405/15 |

* cited by examiner

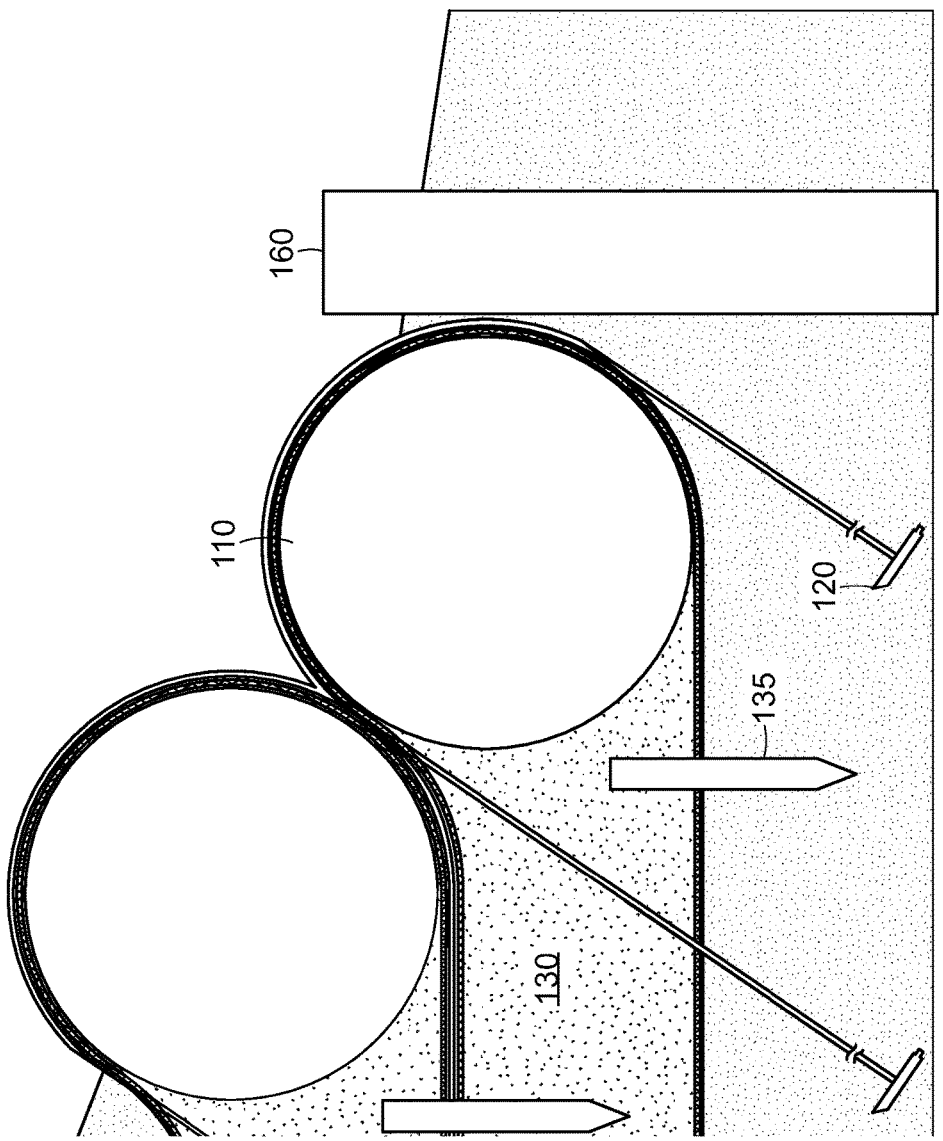

Top View

Front View

Perspective View

Side View

EROSION CONTROL APPARATUS

BACKGROUND OF THE INVENTION

Historically, conventional, or "hard engineering" structures have been used to defend against erosion from adjacent water courses or water bodies. While effective, these techniques have proven to have considerable undesirable physical impacts of increasing erosion to adjacent land forms or other "down-stream" natural resources. This is primarily due to the hardness of these structures which reflect and/or transmit the energy contained in waves, currents, and scour from moving water onto the nearby landforms which have not been "hardened" through the installation of structural elements. The reflection of waves, currents, and scour results in increased erosion of adjacent resources such as beaches, tidal areas, subsurface features immersed in water, river courses, lakebeds, and important upland land features which often protect other structures such as homes, roadways, and utilities.

To address damage to adjacent resources, many regulatory agencies, environmental advocacy organizations, and environmental contractors have embraced bioengineering and the "Living Shoreline" approach, which is now a nationally-known campaign by the National Oceanic and Atmospheric Administration (NOAA) in the United States of America. In some US states, state wetland regulations prohibit the use of conventional hard engineering structures to protect structures on properties. In these instances, "soft", bioengineering measures such as those promoted by the NOAA Living Shoreline program are the only alternatives available for coastal property owners. Unfortunately, bioengineering measures promoted by the Living Shorelines program are not robust or structurally sound enough to defend against erosion in portions of the shoreline which are exposed to higher intensity storms such as oceanfront areas, coastal bays, larger estuaries, larger rivers, and lakes.

Conventional, environmentally friendly bioengineering approaches for stabilizing the base of landforms along exposed shorelines can provide structural integrity at the toe of landforms near the shoreline in order to stabilize these landforms. While these approaches are all somewhat effective at stabilizing exposed landforms, they are generally believed to have much lower success when used along ocean fronting land forms, within larger estuaries, larger rivers, and along the shorelines of larger lakes. It is important to note that an effective and reliable strategy for soft bioengineering methodology presently does not exist for most of the oceanfront, larger estuaries, larger rivers, and along the shorelines of larger lakes. Therefore, the owners of real estate must rely on conventional hard engineering structures, which typically exacerbate shoreline erosion in nearby locations or must rely on substandard soft engineering alternatives which are not robust enough for the given site conditions and level of exposure.

SUMMARY OF THE INVENTION

The present invention addresses the problems of conventional bioengineering installations by providing an erosion control apparatus and methods of installing same. Fiber rolls and fabric encapsulated soil (FES) lifts are combined in anchored configurations together with synthetic mesh netting, to create bioengineered installations with greater durability, greater resistance to storm, sea and water erosion, and corresponding longer useful life, lengthening repair cycles and facilitating the repair process.

In some embodiments, an erosion control apparatus comprises a plurality of fiber rolls, wherein the rolls are arranged relative to a contour of a shoreline; a plurality of anchors coupled to the fiber rolls, the anchors inserted at a depth through the apparatus; a plurality of soil lifts comprising fiber, the soil lifts are connected to the fiber rolls. A mesh can comprise a layer contacting the soil lifts, wherein the anchors pass through the mesh and the soil lifts and optionally enter the soil underneath the apparatus. This operates to distribute the anchoring force across the system.

The plurality of fiber rolls can comprise a coir fiber and can be either high density or low density. In an embodiment, the plurality of anchors are duckbill anchors. The anchors can be spaced at intervals across each fiber roll to distribute loading across the structure. Each anchor can include a cable or rod connected to an anchor point surface sized to support an overlying cone of material. In an embodiment, the intervals range from twenty-four inches to thirty inches, for example. In an embodiment, the anchors can be inserted at a depth of at least forty-two inches below a slope or grade of the apparatus and can provide at least three thousand pounds of holding force at each insertion point.

The soil lifts can comprise at least one layer of coir fabric and may be configured to retain sediment. In some embodiments, the sediment is compacted and can have a depth of at least twelve inches. In some embodiment, the mesh contacting the soil lifts comprises polypropylene or similar synthetic material. In other embodiments, the mesh comprises coir fiber.

In some embodiments, the apparatus further comprises at least a first trench at a highest end of the apparatus. In further embodiments, the apparatus further comprises a second trench located at a lowest end of the apparatus. Each trench can be backfilled with sand or soil. In some embodiments, the first trench and the second trench are at least six inches wide and at least six inches deep. In some embodiments, each trench is covered with sand or soil.

In some embodiments, the apparatus further comprises plant material on or with at least one fiber roll. The mesh may cover at least one of the fiber rolls. Additional lifts may be added over time to the apparatus by constructing more soil lifts on the top or side of the rolls. In some embodiments, the apparatus further comprises at least one erosion control blanket, which can optionally comprise a biodegradable material.

In some embodiments, a plurality of posts are placed along at least a front roll of the apparatus relative to the shoreline. The lifts may be secured with the posts.

In some embodiments, a method of installing erosion control apparatus comprises placing a mesh within an excavated site; placing a layer of coir fabric over the mesh; arranging a plurality of fiber rolls relative to a shoreline; connecting a plurality of soil lifts to the fiber rolls, the soil lifts comprising fiber; folding the mesh and the fabric over the soil lifts and the rolls; and inserting a plurality of anchors adjacent or coupled to the fiber rolls, the anchors being inserted at a depth, wherein each of the anchors passes through the mesh, the fabric, and at least one soil lift.

BRIEF DESCRIPTION OF THE DRAWINGS

FIG. 8 is a side view of stakes utilized in an erosion control apparatus according to some embodiments.

DETAILED DESCRIPTION OF THE INVENTION

Figure 1:
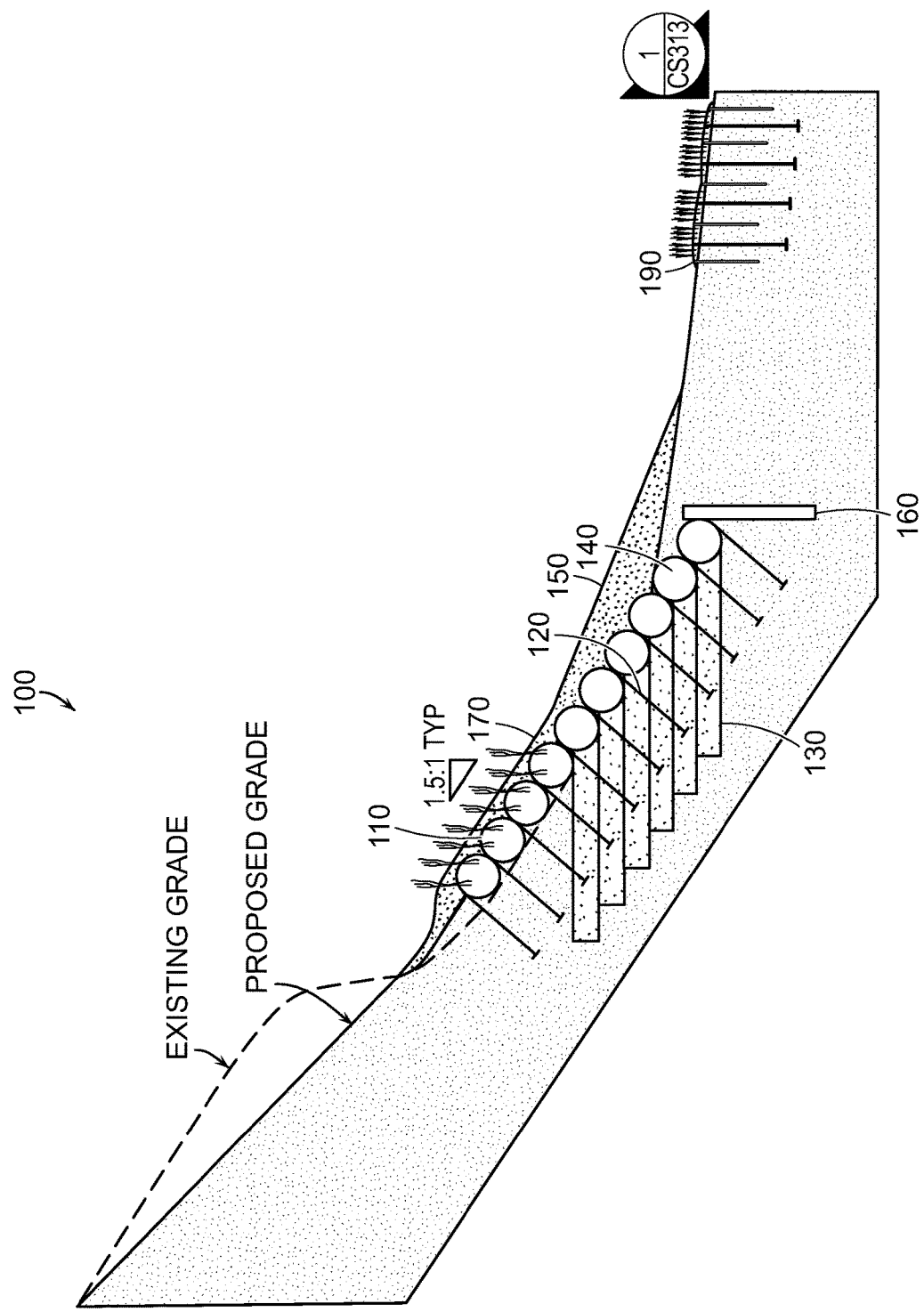
FIG. 1 is a side view of an erosion control apparatus, according to some embodiments.

Reference will now be made in detail to various embodiments of the disclosed devices and methods, examples of which are illustrated in the accompanying drawings. Wherever possible, the same reference numbers will be used throughout the drawings to refer to the same or like parts.

In this application, the use of the singular includes the plural unless specifically stated otherwise. In this application, the use of "or" means "and/or" unless stated otherwise. Furthermore, the use of the term "including", as well as other forms, such as "includes" and "included", is not limiting. Any range described herein will be understood to include the endpoints and all values between the endpoints.

Prior to this disclosure, there has not been a reliable and robust bioengineering method of stabilizing an exposed landform in locations of higher erosion risk, such as oceanfront, estuarine, riverfront, lakefront, and other features of land bordering a body of water.

The present disclosure incorporates the benefits of mass and weight of sediment-filled lifts and the benefits of fiber rolls to prevent sediment from liquefying and flowing through the fabric in storm or flooding events. The present disclosure also relies on anchoring the fiber rolls with the use of earth anchors. The earth anchors can include different structures such as helical-style anchors and duckbill-style anchors, provided they can be positioned below grade and provide superior holding power. In an embodiment, earth anchors provide a minimum of 3,000 pounds of holding force at each anchor point. In an embodiment, each element of the disclosed apparatus provides a minimum of 3,000 pounds of holding force. Anchor points are installed at intervals of approximately twenty-four to thirty inches along an edge of each fiber roll. In an embodiment, the anchor points are installed every thirty inches from along the top and bottom edge of each fiber roll.

Prior to this disclosure, property owners were faced with choosing between substandard, soft bioengineering techniques which require frequent repairs or fail during storm conditions. Such conditions increase the forces of moving water on the bioengineering components or conventional engineering approaches which tend to reflect storm energy and exacerbate erosion damage to adjacent or down-stream natural resources. Neither conventional engineering approaches nor prior bioengineering techniques were well-matched for sea level rise. Conventional engineering measures for erosion control do not support plants and often cannot be expanded in a modular technique without major foundational reconstruction. While fiber rolls and similar bioengineering methods provide good support for the root systems of plants, the inability to hold the fiber rolls in place during a storm event undermines the ability for plants to become established as the plants are damaged every time the array becomes dislodged. Successful bioengineering relies extensively on the integrity of the plant root systems for long-term performance.

The present disclosure not only provides substantially more structural integrity than any other bioengineering method for shoreline protection, but due to its superior structural integrity and ability to support plant growth, the important role plants play in all bioengineering designs is enhanced and secured on a substantially longer timeframe. The disclosed apparatus are also readily expandable, making it possible to increase the number of lifts over time by simply constructing more lifts on the top or sides of the array without making any other structural changes to the array or damaging the supporting bioengineering materials and plants. Conversely, conventional engineering methods such as sea walls often require substantial increases in their foundation or embedment below grade before their height can be increased. The expandability of the present disclosure makes it a preferred alternative in marine environments undergoing sea level rise.

FIG. 1 is a side view of an erosion control apparatus, according to some embodiments. The apparatus 100 comprises at least one coir fiber roll 110. The coir fiber rolls 110 may be either high density or low density. For one example, 20" diameter by 10' long, high density fiber rolls are measured at a nine pound per cubic foot density, comprised of a mattress of inner coir fibers encased in a UV stabilized synthetic polypropylene mesh. Alternatively, the high density fiber rolls are comprised of a mattress of inner coir fibers encased in a 100% biodegradable coir rope mesh. In a further example, 20" diameter by 20' long, low density fiber rolls are measured at a seven pound per cubic foot density, comprised of a mattress of inner coir fibers encased in a UV stabilized synthetic polypropylene mesh. In some embodiments, some or all of the low density fiber rolls are 20" diameter by 10' long.

The coir fiber rolls 110 are arranged along a shoreline, riverbank, lakefront, or other waterfront. The soil behind the coir fiber rolls 110, relative to the shoreline, riverbank, lakefront, or other waterfront, may be graded. In some embodiments, the soil is graded at a slope angle in a range of 0 to 45 degrees (1:1 slope). In an embodiment, the soil is graded at a slope angle in a range of 20 to 50 degrees. In a further embodiment, the soil is graded at a slope angle no greater than 33 degrees (2:1 slope). The coir fiber rolls are described in greater detail below with respect to FIG. 4.

The coir fiber rolls 110 are anchored with the use of anchors 120. The anchors 120 may be referred to as "earth anchors" and may be helical-style anchors, duckbill-style anchors, or any other type of anchor that can be driven below grade. The anchors 120 are inserted at a specified depth into the soil lifts 130 or the soil underneath the apparatus 100. In some embodiments, the anchors 120 are inserted adjacent to the plurality of the coir fiber rolls 110. In an embodiment, each anchor 120 provides a minimum of three thousand pounds of holding force. The distribution of anchors is described with more detail with respect to FIG. 5.

In an embodiment, the anchors 120 are installed across a face of the coir fiber rolls 110. In some embodiments, anchors 120 are inserted through the coir fiber rolls 110. In some embodiments, the anchors 120 are inserted through multiple coir fiber rolls 110. The anchoring system of the apparatus 100 further comprises ¼" galvanized aircraft cable 116 and zinc-coated copper crimps. The crimps are used to form a loop in the cable 116. Cables 116 are attached to each earth anchor 120 by forming a loop with a crimp. One cable 116 may be joined to another cable 116 by securing two loops together. These cables 116 form a network of cables 116 which harness the coir fiber rolls 110 and all tie back to the individual anchors 120 to create a high degree of integrity. The anchors 120 are placed to a depth of at least 42" below finished slope grade into naturally or artificially compacted soil using a hardened steel driving rod. Deeper anchor placements can be used with greater slope angles or more exposed formations.

The apparatus 100 further comprises a plurality of fiber encased soil lifts 130. The soil lifts 130 can comprise two layers of seven hundred-gram (or heavier) woven coir fabric encased by high tenacity polypropylene synthetic mesh 140 that is resistant to ripping. The soil lifts 130 are configured to retain sediment and allow the sediment to naturally compact within the soil lift 130. All sediment in each soil lift 130 preferably has a consistent depth of approximately 12". The sediment in each soil lift 130 can be compacted using a portable plate compactor at 6" soil depth intervals. The soil lifts 130 are connected to the coir fiber rolls 110. Additional soil lifts 130 can be added to the apparatus 100 over time by constructing the additional soil lifts 130 onto the top of the coir fiber rolls 110, for example. The completed series of coir fiber rolls and soil lifts may be referred to as a protection array, configured to protect a shoreline. In some embodiments, the coir fiber rolls 110 are incorporated into, or encapsulated within, the soil lifts 130.

The synthetic mesh 140 is incorporated as an outward layer of fabric used for developing fabric encased soil lifts. In some embodiments, the mesh 140 comprises raschel polypropylene knotless netting, 3 mm high tenacity (rip resistant), 1½" mesh opening, with enhanced UV stabilization. In other embodiments, the mesh 140 comprises 100% biodegradable coir fabric. In some embodiments, the mesh opening can range from ½" to 7". In an embodiment, the mesh 140 covers the coir fiber rolls 110 that are not filled with plant material 170. In a preferred embodiment, the netting is not photo-degradable. The earth anchors 120 pass through the mesh 140 and soil lifts 130 into the soil beneath.

After installation of the mesh 140, the coir fiber rolls 110 covered by the mesh 140 are at least partially covered by sand 150. In an embodiment, the first six coir fiber rolls 110 relative to the shoreline, riverbank, lakefront, or other waterfront are at least partially covered by the mesh 140 and sand 150. The number of coir fiber rolls 110 covered by the mesh 140 and 150 may be adjusted based on the conditions of the site of the apparatus 100. The inclusion of sand 150 is described in more detail below with respect to FIGS. 6A and 6B.

A plurality of posts 160 may be placed at intervals along at least the front coir fiber roll 110 of the apparatus 100 relative to the shoreline, riverbank, lakefront, or other waterfront. The posts 160 provide additional support for the apparatus 100. In an embodiment, the posts 160 may be 4" by 4" or 6" by 6", and spaced at 5 foot intervals along the first coir fiber roll 110. In some embodiments, the apparatus 100 does not include posts 160.

In some embodiments, coir fiber rolls 110 not covered by the mesh 140 are filled with plant material 170. In other embodiments, at least one of the coir fiber rolls 110 covered by the mesh 140 or incorporated into the soil lifts 130 are filled with the plant material 170. The plant material 170 may be any vegetation with suitable roots for securing the apparatus 100 from eroding. In an embodiment, the plant material 170 is American beachgrass. In other embodiments, the plant material 170 may be any native plantings appropriate to the site conditions, which will grow quickly and stabilize the landform.

In some embodiments, the apparatus 100 includes marsh pillows 190. The pillows 190 may be installed between the apparatus 100 and the shoreline. The pillows 190 are described in greater detail below with respect to FIG. 7.

Figure 2:
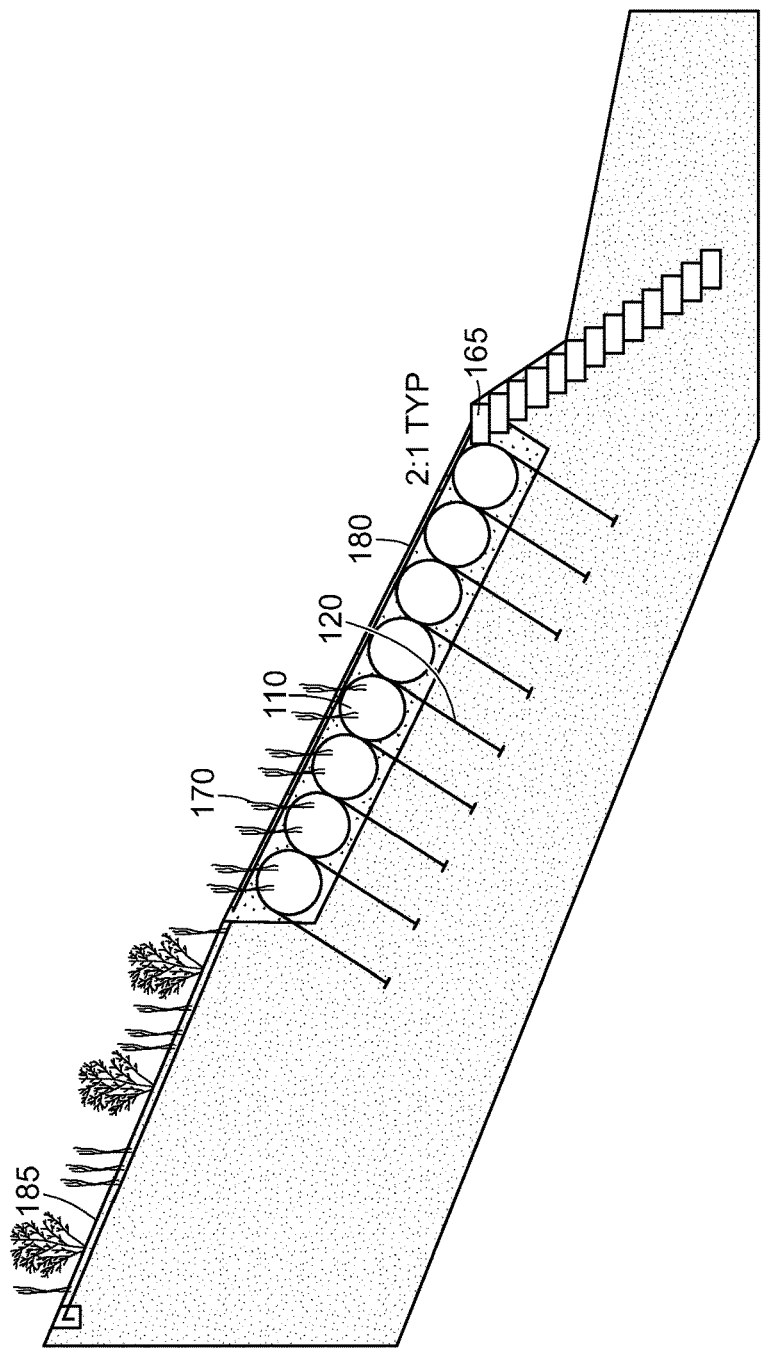
FIG. 2 is a side view of an erosion control apparatus including wire baskets, according to some embodiments.

FIG. 2 is a side view of an erosion control apparatus 100, according to some embodiments. In these embodiments, the apparatus 100 includes at least one wire basket 165. In some embodiments, the wire basket 165 is a vinyl coated, welded, and galvanized gabion. The wire basket may be utilized as a substitute of the anchor posts 160 or in conjunction with the anchor posts 160. In some embodiments, the dimensions of the wire baskets 165 are at least 1'×2'×6". The wire baskets 165 can be filled with heavy materials such as rock or shells.

In an embodiment, the apparatus 100 further comprises at least one erosion control blanket 180. In an embodiment, the blanket 180 is biodegradable and may degrade over approximately a three year period. In a further embodiment, the blanket 180 comprises coir fiber netting. The blanket 180 may be secured with the posts 160. In some embodiments, the blanket 180 may be secured with the earth anchors 120. If multiple blankets are employed, an interior blanket is typically a straw/coir/jute, short term, composite erosion control blanket and an exterior blanket is typically 700 or 900-gram woven coir fabric. The blanket 180 is further configured to provide UV protection to the coir fiber rolls 110. The blanket 180 is further configured to prevent chafing between the coir fiber rolls 110 and the cables 116 during storm events.

In an embodiment, a composite erosion control blanket 185 is installed within forty-eight hours of grading the soil behind the coir fiber rolls 110 relative to the shoreline, riverbank, lakefront, or other waterfront. In an embodiment, the composite erosion control blanket 185 is secured with a first trench located at a first end of the apparatus 100, the first end being positioned substantially parallel to the shoreline and at a highest end of the apparatus 100 furthest from the shoreline. In a further embodiment, the mesh 140 is secured with a second trench at a second end of the apparatus 100, the second end being positioned substantially parallel to the shoreline and at a lowest end of the apparatus 100 closest to the shoreline. In an embodiment, the trenches are 6"×6" (that is at least six inches wide and six inches deep) lock-in trenches at the top and bottom of the slope with a minimum of 6" overlaps in the transition from one horizontal width of erosion control blanket to the next. 30" hardwood stakes 135 can be used at a spacing of 36" on center with ¼" biodegradable twine used to secure the composite 185 to the ground surface. The trenches may be backfilled, seeded, and lightly mulched with sterilized, weed-free chopped straw or comparable equivalent mulch product.

Figure 3:
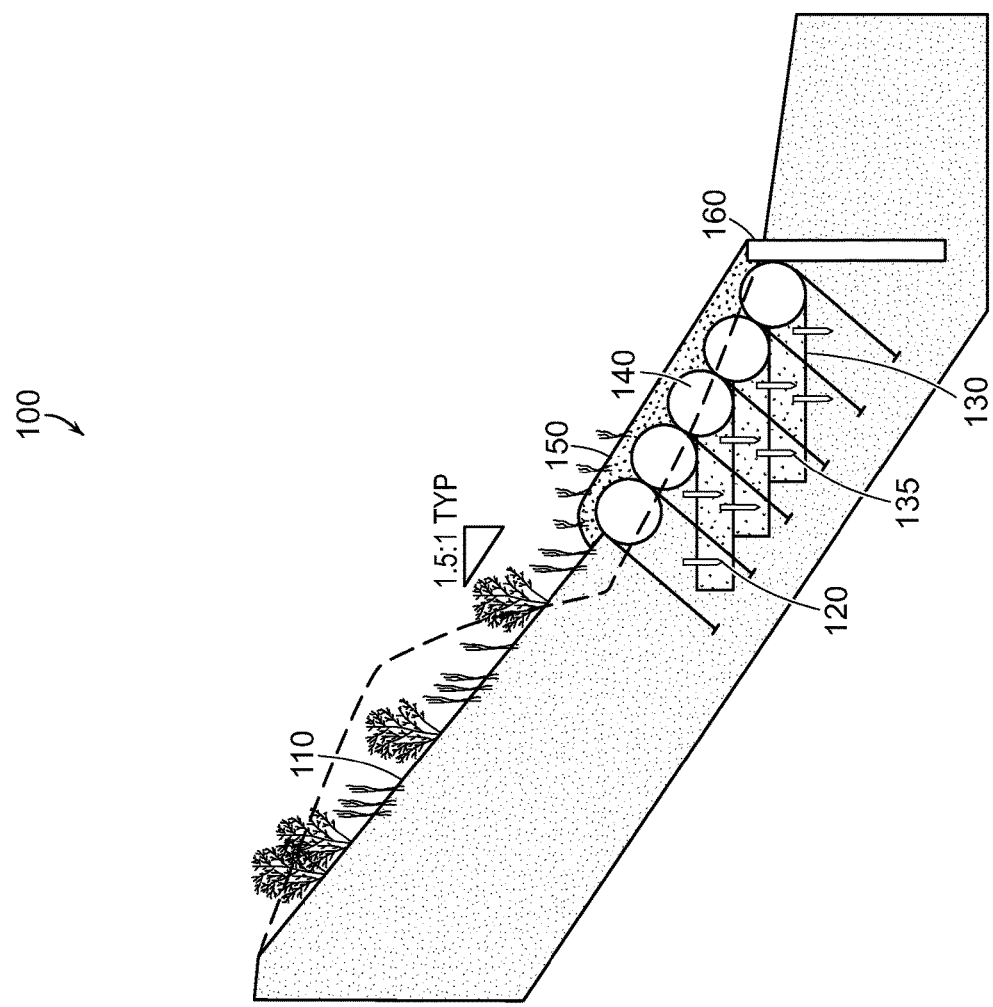
FIG. 3 is a side view of an erosion control apparatus including stakes, according to some embodiments.

FIG. 3 is a side view of an erosion control apparatus 100, according to some embodiments. In some embodiments, the apparatus 100 includes at least one stake 135. The stakes 135 may be inserted through the soil lifts 130. The stakes are described in more detail below with respect to FIG. 8.

Figure 4:
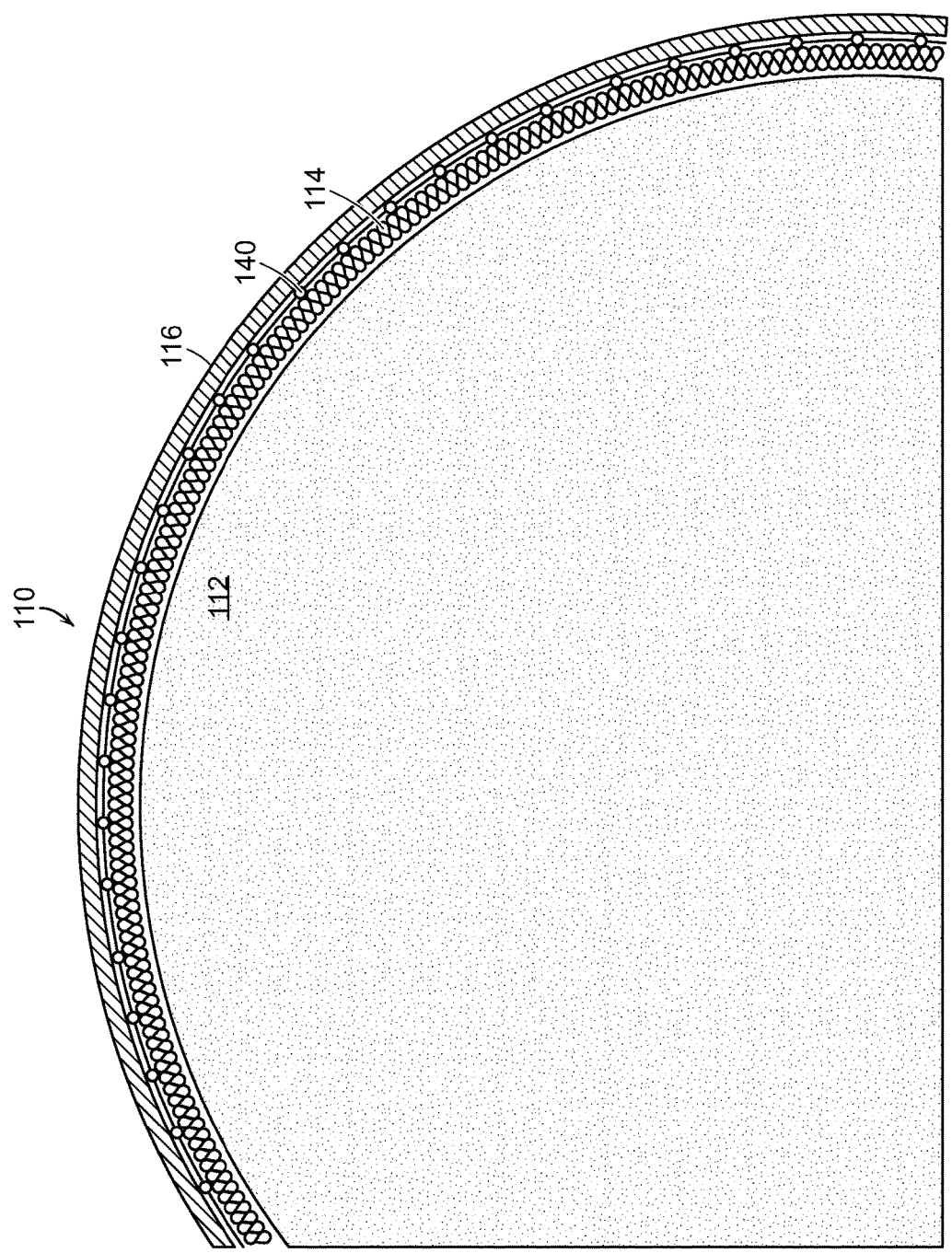
FIG. 4 is a close-up side view of a coir fiber roll according to some embodiments.

FIG. 4 is a close-up side view of a coir fiber roll 110 according to some embodiments. A coir fiber roll 110 includes an inner portion 112 of coir fiber. In some embodiments, the inner portion 112 of coir fiber is 20" in diameter. The inner portion is surrounded by a layer 114 of coir fabric. In some embodiments, the weight of the layer 114 of coir fabric may range between seven hundred to nine hundred grams. The layer 114 of coir fabric may be covered by the mesh 140. Cables 116 may be secured around the mesh 140. The cables 116 are attached to the anchors 120. In some embodiments, the cables 116 are spaced at two and a half feet distances across the coir fiber rolls 110.

Figure 5:
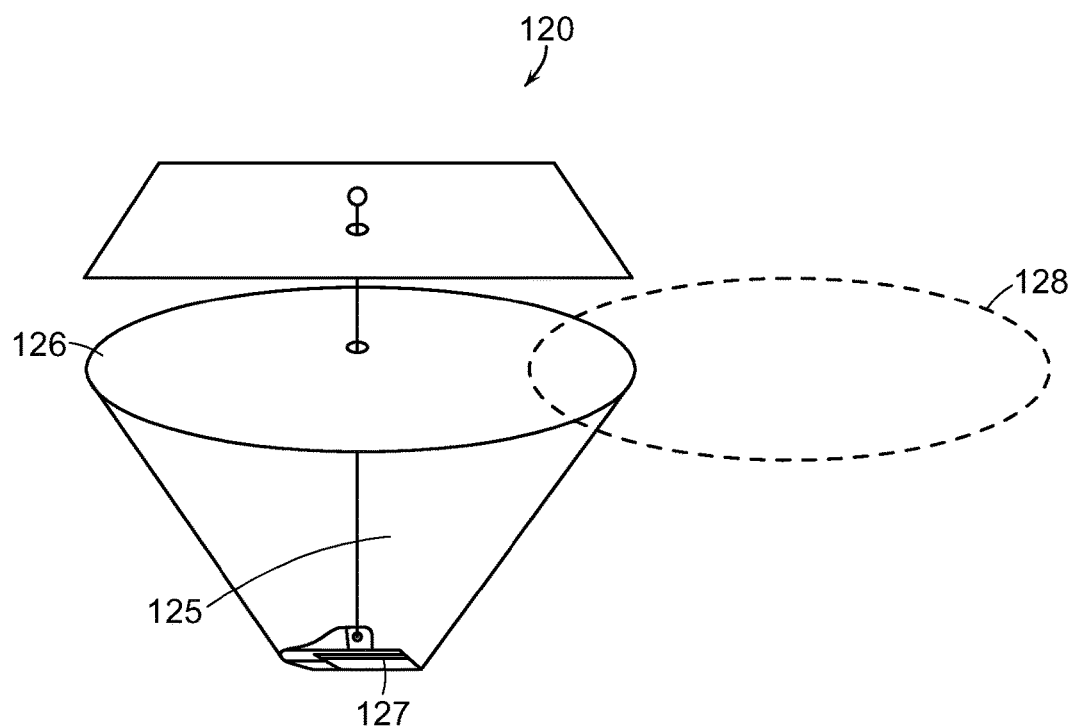
FIG. 5 depicts a side view of an anchor's load according to some embodiments.

FIG. 5 depicts a side view of an anchor's load according to some embodiments. In some embodiments, an anchor 120 is driven into the soil at a ninety degree angle relative to the soil. In some embodiments, an anchor 120 is locked into place by applying stress to the anchor tendon 125, the connecting segment or element of the anchor 120 in the opposite direction to which the anchor 120 was driven. The tendon 125 is generally a steel aircraft cable or a metal rod. The anchor 120 rotates ninety degrees and a frustum cone 126 of soil is formed as the soil is compacted and bonded. The frustum cone 126 enables an anchor 120 to support a large load. In some embodiments, each anchor 120 supports three thousand pounds of force.

The anchors 120 utilized in the apparatus 100 may be helical-style anchors, duckbill-style anchors, or any other type of anchor that can be driven below grade. In a preferred embodiment, the apparatus utilizes duckbill-style anchors. In some embodiments, the anchors 120 may be installed approximately every twenty-four to thirty inches along the top and bottom edge of each coir fiber roll 110.

The density of the anchors 120 per square foot is dependent on the height of the apparatus 100. In an embodiment with 2.5' and 3.3' spacing between the center axes of adjacent coir fiber rolls 110, the apparatus includes three to four cables 116 per coir fiber roll 110. Therefore the range of anchor density for an apparatus 100 from one coir fiber roll 110 high to one hundred coir fiber rolls 110 high is generally in a range of eighteen to forty-eight anchors 120 per one hundred square feet.

In an embodiment including four cables 116 per 10' coir fiber roll 110, the anchor density can be twenty-four to forty-eight anchors 120 per one hundred square feet. In embodiment including one coir fiber roll 110, the anchor density can be thirty-six to forty-eight anchors 120 per one hundred square feet. In an embodiment including five coir fiber rolls 110, the anchor density can be twenty-two to twenty-nine anchors 120 per one hundred square feet. In an embodiment including ten coir fiber rolls 110, the anchor density can be twenty to twenty-six anchors 120 per one hundred square feet. In an embodiment including one hundred coir fiber rolls 110, the anchor density can be eighteen to twenty-four anchors 120 per one hundred square feet.

In one embodiment, at least twenty to twenty-nine anchors 120 are inserted per one hundred square feet. In an embodiment, the anchors 120 are driven into the soil by a hydraulic hammer. Typically, the anchors 120 have a distal portion comprising an anchor point 127 that can comprise a duckbill or helical segment, or a plate, for example. This anchor point 127 has a surface area that supports a cone shaped load 126 of overlying soil and structure. The anchors 120 are positioned so that the cone shaped load 126 at least overlaps the cone 128 of an adjoining anchor 120. In a further embodiment, the anchors 120 are driven into the soil by an impact of eighteen ft/lb of impact energy at a rate of two thousand three hundred (2300) blows/minute, for example. This impact energy can vary depending on soil conditions and the anchor depth requirements at a given installation.

Figure 6A:
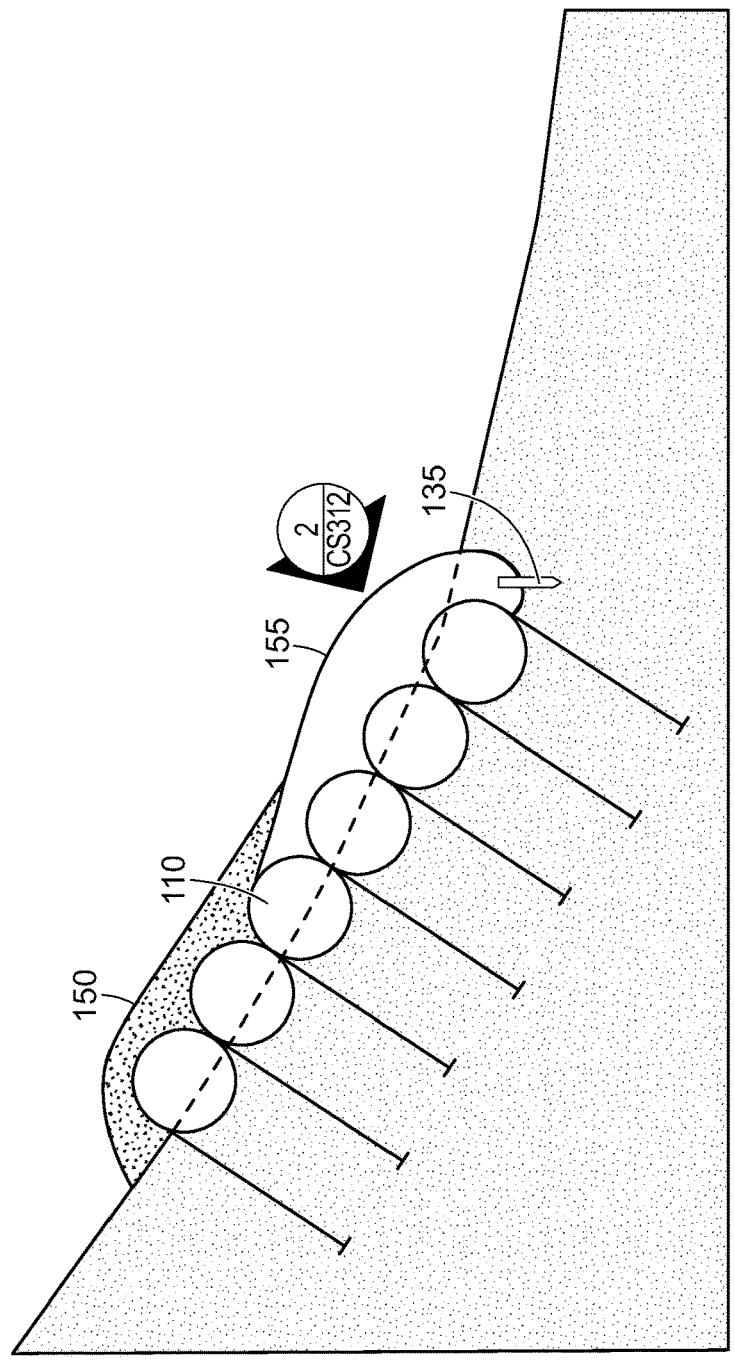
FIGS. 6A and 6B are side views of coir fiber rolls covered in sand according to some embodiments.
Figure 6B:
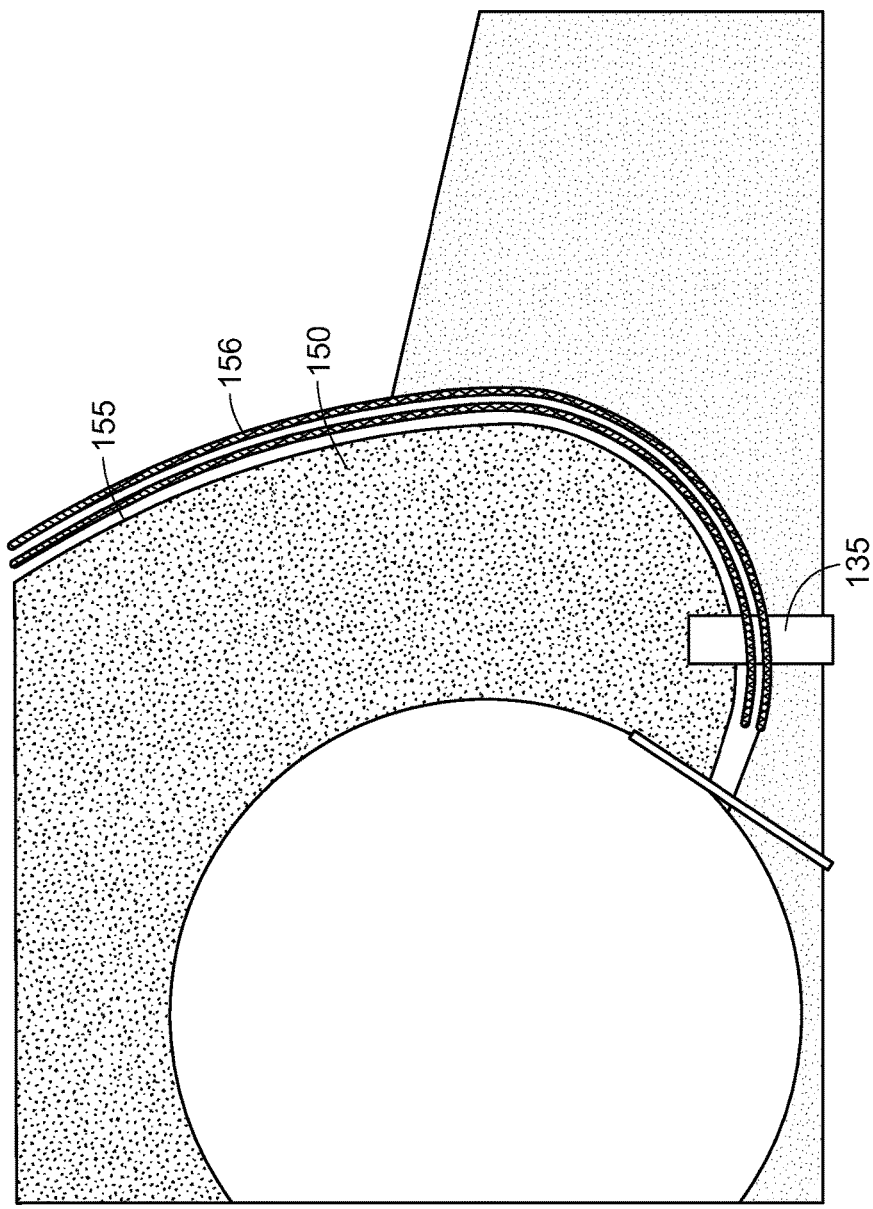

FIGS. 6A and 6B are side views of coir fiber rolls 110 covered in sand 150 according to some embodiments. The coir fiber rolls 110 may be covered solely by sand 150, by sand 150 within a burlap layer 155, or a combination of sand 150 and burlap 155. In some embodiments, the burlap layer 155 is covered by two layers of coir fiber 156. The burlap layer 155 and the two layers of coir fiber 156 may be secured in the soil by at least one stake 135. The burlap layer 155 may be biodegradable. In some embodiments, coir fiber rolls 110 disposed closer to the shoreline are covered by sand 150 with the burlap layer 155 and the coir fiber rolls disposed furthest from the shoreline are covered by sand 150.

Figure 7:
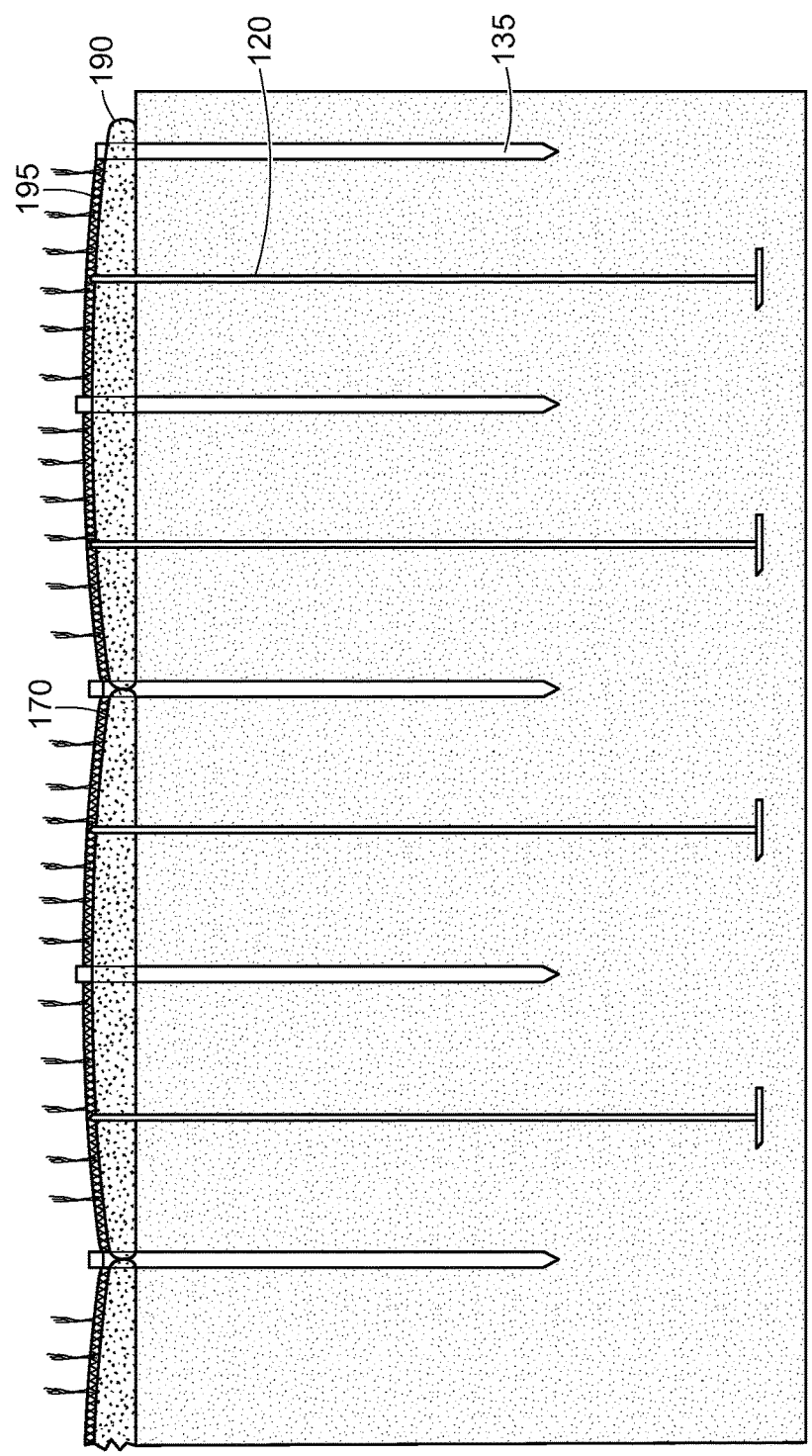
FIG. 7 is a side view of marsh pillows or containers according to some embodiments.

FIG. 7 is a side view of marsh pillows or containers 190 according to some embodiments. In some embodiments, the marsh pillows 190 are disposed between the coir fiber rolls 110 and the shoreline. In some embodiments, the marsh containers 190 are composed of coir material filled with loose coir fiber and compost. In some embodiments, the marsh containers 190 range from 2"-7" thick and 1'-6' wide. In further embodiments, the marsh containers 190 range from 4"-5" thick and 3'-4' wide. In some embodiments, the marsh containers 190 are surrounded by biodegradable rope 195.

The marsh containers 190 may be secured to the soil by an anchor 120, a stake 135, or combinations thereof. In some embodiments, the marsh containers 190 are fastened to cables 116 with four anchors 120 per marsh container 190 In some embodiments, the marsh containers 190 are filled with plant material 170. In further embodiments, the plant material 170 may be maritime grasses native to the shoreline.

FIG. 8 is a side view of stakes 135 utilized in an erosion control apparatus 100 according to some embodiments. At least one stake 135 is driven through each soil lift 130. The stakes 135 may be driven through a soil lift 130 into the soil or driven through a first soil lift 130 into another soil lift 130 disposed beneath the first soil lift.

Figure 9A:
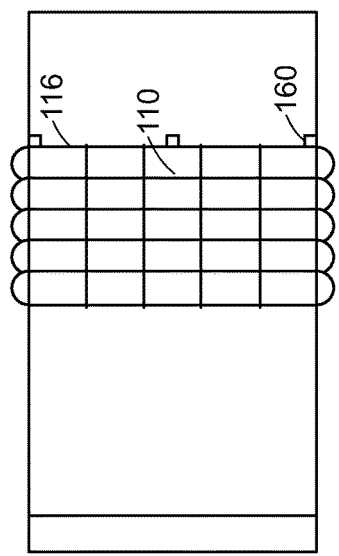
FIGS. 9A, 9B, 9C, and 9D are a top view, side view, perspective view, and a front view of an assembled apparatus according to some embodiments.
Figure 9D:
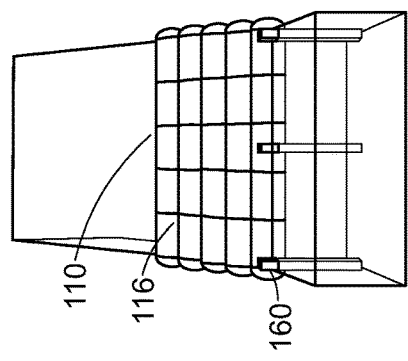
Figure 9C:
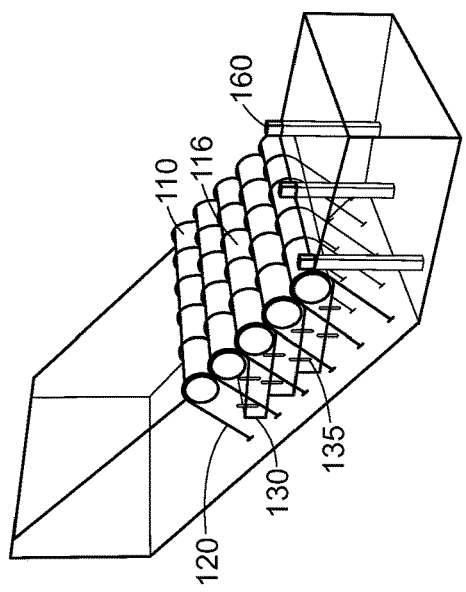
Figure 9B:
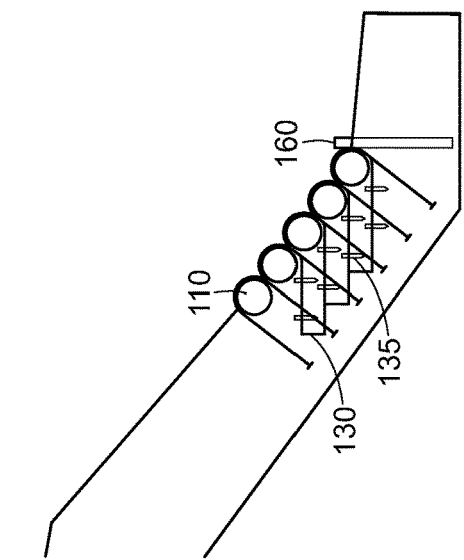

FIGS. 9A, 9B, 9C, and 9D are a top view, side view, perspective view, and a front view of an assembled apparatus 100 according to some embodiments. FIGS. 9A, 9C, and 9D depict the spacing of the cables 116 across the coir fiber rolls 110 according to some embodiments. FIGS. 9A, 9C, and 9D also depict the spacing of the posts 160 across the closest coir fiber roll 110 according to some embodiments.

Figure 10A:
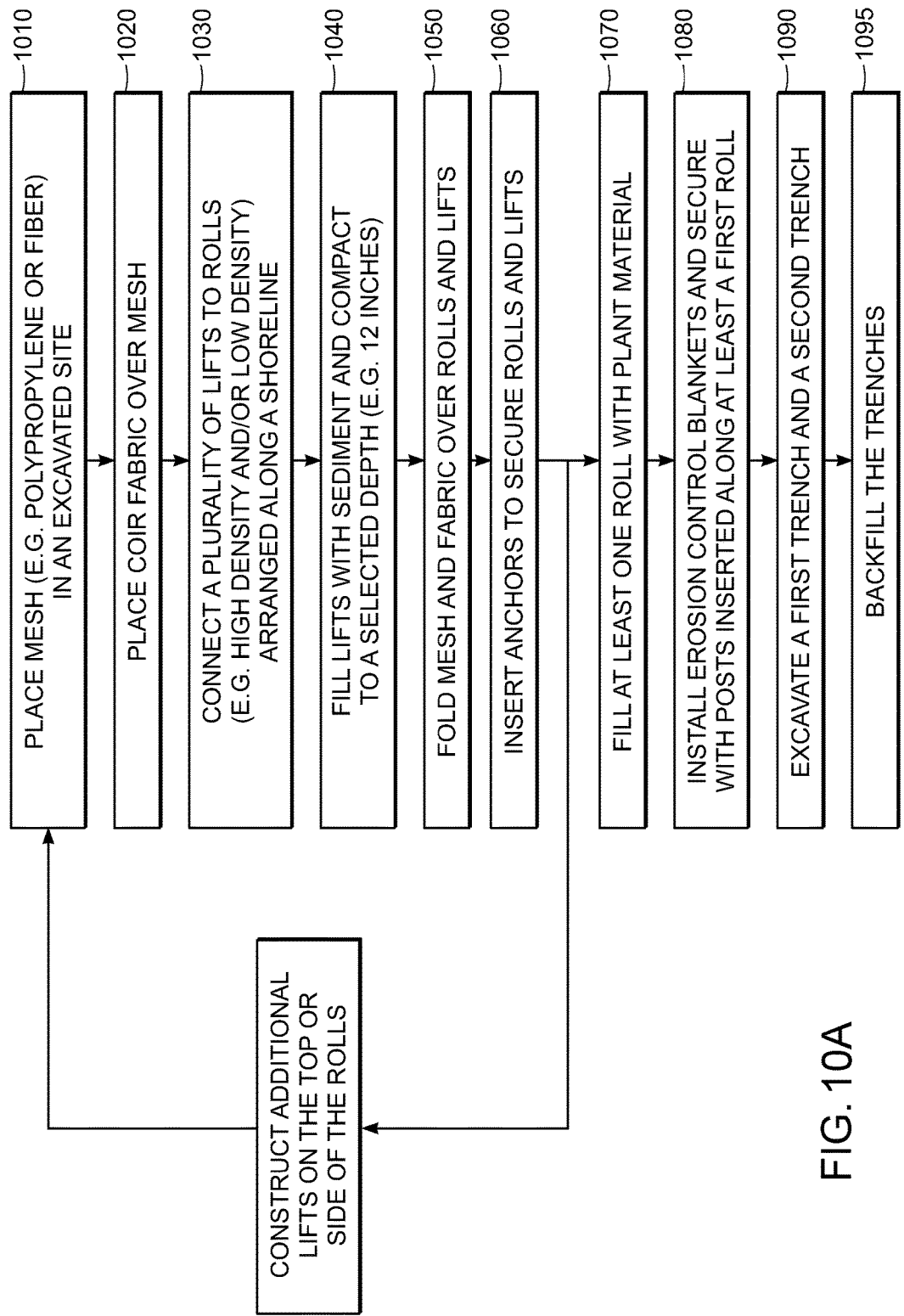
FIG. 10A depicts a method of installing an erosion control apparatus, according to some embodiments.

FIG. 10A depicts a method of installing an erosion control apparatus, according to some embodiments. The method begins when a layer of mesh is placed within an excavated site (Step 1010). The soil behind the site, relative to the shoreline, riverbank, lakefront, or other waterfront, may be graded. The mesh may comprise raschel polypropylene knotless netting (or comparable equivalent), 3 mm high tenacity (rip resistant), 1½" mesh opening, with UV stabilization, or may comprise coir fiber. The netting can be biodegradable or in a preferred embodiment is non-photodegradable. In some embodiments, the mesh opening can range from ½" to 7". Next, at least one layer of coir fabric is placed over the mesh (Step 1020). In some embodiments, two layers of seven hundred gram (or heavier) coir fabric is layered over the mesh. In some embodiments, one or two layers of 700-gram woven coir fabric encased by high tenacity (rip resistant) polypropylene synthetic mesh comprise a soil lift.

Coir fiber rolls are then arranged in the site relative to the shoreline and connected within the soil lifts (Step 1030). A coir fiber roll may be a 20" diameter by 10' long, measured at a nine pound per cubic foot density, comprised of a mattress of inner coir fibers encased in a UV stabilized synthetic polypropylene mesh. Alternatively, the coir fiber roll may be a mattress of inner coir fibers encased in a 100% biodegradable coir rope mesh. The soil lifts are filled with sediment and the sediment is compacted (Step 1040). All sediment in each soil lift has a consistent depth of approximately 12". The sediment in each soil lift is compacted using a portable plate compactor at 6" soil depth intervals.

Then the mesh and the coir fabric are folded over the coir fiber rolls and soil lifts (Step (1050). In an embodiment, the number of coir fiber rolls in the apparatus and the number of coir fiber rolls covered by the mesh are determined by specific design criteria varying with each installation site. In an embodiment, the mesh is installed as each lift is constructed. The completed series of coir fiber rolls and soil lifts may be referred to as a protection array.

The method continues when a plurality of anchors are inserted and coupled to the rolls to secure the rolls to the soil lifts. (Step 1060). Step 1060 is described in further detail below in regards to FIG. 10B. Steps 1010 through 1060 may be repeated as necessary to construct additional soil lifts. The additional soil lifts may be constructed on the top or the side of the rolls.

After construction of the soil lifts is completed, at least one coir fiber roll is filled with plant material (Step 1070). The plant material may be any vegetation with suitable roots for securing the apparatus from eroding. In an embodiment, the plant life is American beachgrass. In other embodiments, the plant material may be any native plantings appropriate to the site conditions, which will grow quickly and stabilize the landform. Next at least one biodegradable erosion control blanket is installed and secured with posts inserted along at least a first fiber roll (Step 1080). The blanket may be installed along all disturbed and/or unstable ground located above the protection array. In an embodiment, the blanket is biodegradable. In a further embodiment, the blanket comprises coir fiber netting. If multiple blankets are employed, an interior blanket is typically a straw/coir/jute, short term, composite erosion control blanket and an exterior blanket is typically 700 or 900 gram woven coir fabric. The at least one blanket is secured when a plurality of posts are inserted through the blanket along at least a first roll of the apparatus relative to the shoreline, riverbank, lakefront, or other waterfront. The plurality of posts may be 4" by 4" or 6" by 6", and spaced at 5 foot intervals along the first coir fiber roll. The blanket may additionally be secured by a biodegradable twine used to secure the blanket firmly to the soil. The twine may extend from the highest elevation of destabilized or disturbed soil down the uppermost soil lift.

A first trench is excavated at a highest end of the apparatus and a second trench is excavated at a lowest end of the apparatus. (Step 1090). In some embodiments, only a first trench is excavated. In an embodiment, the trenches are 6"×6" (that is at least six inches wide and six inches deep) lock-in trenches at the top and bottom of the slope with a minimum of 6" overlaps. 30" hardwood stakes may be used at a density of 36" on center with ¼" biodegradable twine used to secure the mesh to the ground surface. The trenches are be backfilled, seeded, and lightly mulched with sterilized, weed-free chopped straw or comparable equivalent mulch product. (Step 1095).

Figure 10B:
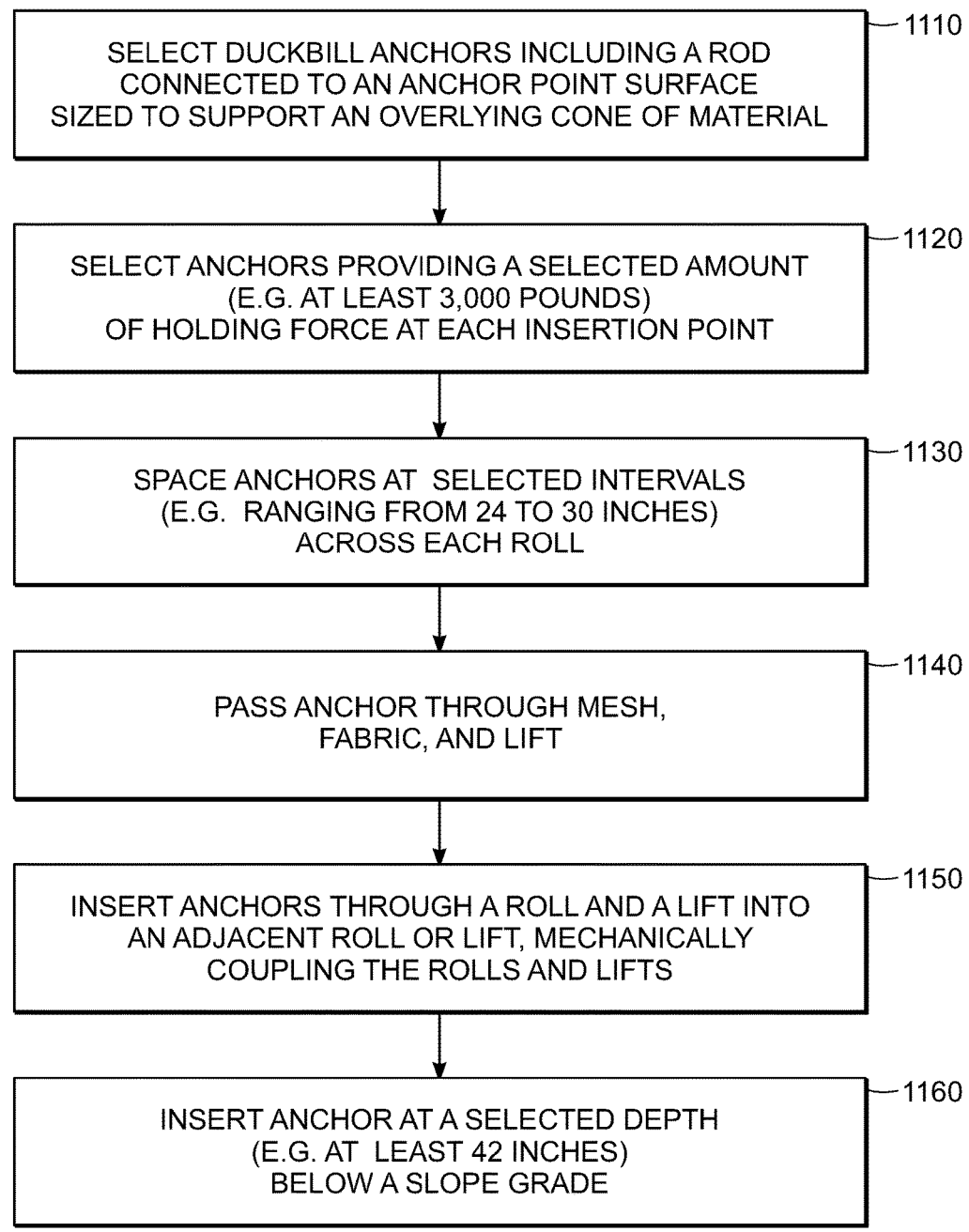
FIG. 10B depicts a method of inserting anchors to secure fiber rolls and soil lifts according to some embodiments.

FIG. 10B depicts a method of inserting anchors to secure fiber rolls and soil lifts according to some embodiments. The method begins when duckbill anchors including a rod connected to an anchor point surface sized to support an overlying cone of material are selected (Step 1110). Anchors providing at least 3,000 pounds of holding force at each insertion point (Step 1120). After the anchors are selected, the anchors are spaced approximately every twenty-four to thirty inches along the top and bottom edge of each coir fiber roll (Step 1130). In one embodiment, at least twenty to twenty-nine anchors are inserted per one hundred square feet.

The anchors are passed through the mesh, coir fabric, and soil lift (Step 1040). In a preferred embodiment, the anchors pass through the mesh and soil lifts, which operates to distribute the anchoring force across the entire embedded structure. The coir fiber rolls are anchored with the use of earth anchors and the earth anchors can be inserted through the rolls. Next, the anchors are inserted through a coir fiber roll and a soil lift into an adjacent coir fiber roll or soil lift, mechanically coupling the coir fiber rolls and soil lifts (Step 1150). The anchors pass through the mesh and soil lifts to distribute the anchoring force across the system.

In an embodiment, the anchors are inserted at a fixed depth into soil underneath the apparatus; the depth being at least forty-two inches (Step 1060). In the above methods, the anchors may be earth anchors. The earth anchors may be helical-style anchors, duckbill-style anchors, or any other type of anchor that can be driven below grade.

In one embodiment, after a soil lift is compacted, a roll is placed along the "water" side of the lift and the blanket and mesh are folded back toward the landform. In one embodiment, the anchors are driven into the soil after each grouping of the lift, roll, blanket, and mesh are constructed. In another embodiment the anchors may be driven into the soil after each individual lift is constructed, after 2-3 lifts have been constructed or after all the lifts are constructed. In an embodiment utilizing duckbill anchors, anchors should be installed after a lift is constructed. In an embodiment utilizing helical anchors, the anchors may be installed prior to construction of the lifts and steel cables would need to be pulled up through the lifts.

Other embodiments will be apparent to those skilled in the art from consideration of the specification and practice of this disclosure. It is intended that the specification and examples be considered as exemplary only, with the true scope and spirit of the disclosed devices and methods being indicated by the following claims.

What is claimed is:

1. An erosion control apparatus comprising:
 a plurality of fiber rolls, wherein the fiber rolls are arranged on a grade relative to a contour of a shoreline at a slope angle in a range of 20 degrees to 50 degrees;
 a plurality of anchors, wherein each anchor is coupled to a surface of at least one of the fiber rolls with a cable extending from the at least one fiber roll at an angle directed into the grade on which the fiber rolls are positioned at the slope angle, such that said anchor is positioned at a depth below the at least one fiber roll;
 a plurality of soil lifts, each soil lift comprising a fibrous layer encasing material within the soil lift, and the fibrous layer of each soil lift is connected to at least one of the fiber rolls; and
 a mesh, the mesh comprising a layer contacting at least one of the soil lifts, wherein at least a portion of the cable for each anchor passes through the mesh and at least one of the soil lifts and wherein at least one of the fiber rolls is positioned over at least one of the anchors.

2. The apparatus of claim 1, wherein the fiber rolls comprise high density or low density coir fiber.

3. The apparatus of claim 1, wherein the anchors are duckbill anchors spaced at intervals across each fiber roll, each cable connected to an anchor point surface of each anchor that is sized to support an overlying cone of material that includes at least one soil lift.

4. The apparatus of claim 3, wherein the intervals range from 24 inches to 60 inches.

5. The apparatus of claim 1, wherein the anchors are inserted at a depth of at least 42 inches into a slope of the apparatus.

6. The apparatus of claim 1, wherein each anchor provides at least 3,000 pounds of holding force at each insertion point, each cable being coupled to an anchor point of each anchor, each anchor point having a surface area.

7. The apparatus of claim 1, wherein each soil lift comprises at least one layer of coir fabric configured to retain sediment.

8. The apparatus of claim 7, wherein the sediment is compacted and wherein the sediment has a depth of at least 12 inches.

9. The apparatus of claim 1, wherein the mesh comprises polypropylene.

10. The apparatus of claim 1, wherein the mesh further comprises a coir fiber.

11. The apparatus of claim 1, further comprising a first trench located at a highest end of the apparatus; the trench being backfilled, wherein the first trench is at least 6 inches wide and at least 6 inches deep.

12. The apparatus of claim 11, wherein the trench is covered with sand or soil.

13. The apparatus of claim 1, further comprising plant material positioned on or within at least one fiber roll.

14. The apparatus of claim 1, wherein the mesh covers at least one of the fiber rolls.

15. The apparatus of claim 1, further comprising at least one erosion control blanket, wherein the blanket comprises a biodegradable material.

16. The apparatus of claim 1, further comprising a plurality of posts placed along at least a front roll of the apparatus relative to the shoreline, wherein the lifts are secured with the posts.

17. The apparatus of claim 1, further comprising one or more helical anchors connected to one or more of the plurality of fiber rolls.

18. The apparatus claim 17, wherein the one or more helical anchors extend underneath the one or more fiber rolls at an angle directed into the grade on which the fiber rolls are positioned at the slope angle.

19. A method of installing an erosion control apparatus comprising:
  placing a mesh within an excavated site;
  arranging a fiber roll relative to a shoreline at a slope angle in a range of 20 degrees to 50 degrees;
  connecting a soil lift to the fiber roll, the soil lift to form a first layer of the apparatus comprising a fibrous layer that encases a material within said soil lift, the soil lift comprising fiber that is connected to at least one fiber roll;
  folding the mesh and the fabric over the soil lift and the fiber roll;
  repeating the above steps to form a plurality of layers, each layer comprising at least one fiber roll of a plurality of fiber rolls positioned along a grade at the slope angle; and
  inserting a plurality of anchors such that each anchor is coupled to at least one fiber roll with a cable extending from at least one fiber roll at an angle directed into the grade on which the fiber rolls are positioned at the slope angle, the anchors inserted at a depth, wherein at least a portion of the cable for each of the anchors passes through the mesh, the fabric, and at least one soil lift, and wherein at least one of the fiber rolls is positioned over at least one of the anchors.

20. The method of claim 19, wherein the fiber rolls comprise high density or low density coir fiber.

21. The method of claim 19, wherein the anchors are duckbill anchors spaced at intervals across each fiber roll, each anchor having an anchor point surface sized to support an overlying cone of material.

22. The method of claim 21, wherein the intervals range from 24 inches to 30 inches.

23. The method of claim 19, wherein the anchors are inserted at a depth of at least 42 inches into a slope of the apparatus.

24. The method of claim 19, wherein each anchor provides at least 3,000 pounds of holding force at each insertion point, each cable being coupled to an anchor point of each anchor, each anchor point having a surface area.

25. The method of claim 19, wherein the soil lifts comprise at least one layer of coir fabric.

26. The method of claim 19, further comprising compacting sediment and filling the soil lifts with the compacted sediment having a consistent depth of at least 12 inches.

27. The method of claim 19, wherein the mesh comprises polypropylene.

28. The method of claim 19, wherein the mesh comprises coir fiber.

29. The method of claim 19, further comprising:
  excavating a first trench located at a highest end of the apparatus, wherein the first trench is at least 6 inches wide and at least 6 inches deep; and
  covering the trench.

30. The method of claim 29, wherein the trench is backfilled with sand or soil.

31. The method of claim 19, further comprising filling at least one of the fiber rolls with plant material.

32. The method of claim 19, further comprising constructing additional soil lifts on a top or side of the fiber rolls.

33. The method of claim 19, further comprising installing at least one erosion control blanket, wherein the blanket comprises a biodegradable material and wherein at least one post secures the blanket.

34. The method of claim 33, further comprising inserting a plurality of posts along at least a first fiber roll of the apparatus.

35. The method of claim 19, further comprising inserting one or more helical anchors connected to at least one fiber roll.

36. The method of claim 35, wherein the one or more helical anchors extend underneath the one or more fiber rolls at an angle directed into the grade on which the fiber rolls are positioned at the slope angle.

37. An erosion control apparatus comprising:
  a plurality of fiber rolls, wherein the fiber rolls are arranged on a grade at a slope angle in a range of 20 degrees to 50 degrees,
  a plurality of anchors, wherein each anchor is coupled to at least one of the fiber rolls with a cable situated across a face of at least one of the fiber rolls, each anchor having a surface area, said anchor inserted at a depth below the at least one fiber roll, the anchors extending from the fiber rolls at an angle directed into the grade on which the fiber rolls are positioned at the slope angle, and wherein at least one of the fiber rolls is positioned over at least one of the anchors; and
  a plurality of soil lifts, each soil lift comprising a fibrous layer encasing material within said soil lift, and each soil lift connected to at least one of the fiber rolls;

wherein the cable for at least a subset of the anchors passes through at least two of the soil lifts.

38. The apparatus of claim 37, wherein each anchor provides at least 3,000 pounds of holding force at each insertion point.

39. The apparatus of claim 37, further comprising one or more helical anchors connected to one or more of the plurality of fiber rolls.

40. The apparatus claim 39, wherein the one or more helical anchors extend underneath the one or more fiber rolls at an angle directed into the grade on which the fiber rolls are positioned at the slope angle.

\* \* \* \* \*